(12) United States Patent
Cowelchuk et al.

(10) Patent No.: US 7,478,854 B2
(45) Date of Patent: *Jan. 20, 2009

(54) AUTOMOTIVE HANDLE WITH SOFT FEEL AND METHOD OF MAKING THE SAME

(75) Inventors: Glenn A Cowelchuk, Chesterfield Township, MI (US); Todd L DePue, Brighton, MI (US); David Dooley, Troy, MI (US); Michael J Hier, Milford, MI (US); Randy S Reed, Fair Haven, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/904,011

(22) Filed: Oct. 19, 2004

(65) Prior Publication Data

US 2006/0082174 A1    Apr. 20, 2006

(51) Int. Cl.
*B60J 7/00* (2006.01)
(52) U.S. Cl. .................. 296/1.02; 296/1.08; 296/146.7
(58) Field of Classification Search ................ 296/1.02, 296/1.08, 1.09, 187.05, 146.7
See application file for complete search history.

(56) References Cited

U.S. PATENT DOCUMENTS

| | | | |
|---|---|---|---|
| 3,400,979 A | 9/1968 | James et al. | ................. 297/412 |
| 3,833,964 A | 9/1974 | Harcourt | |
| 4,124,308 A | 11/1978 | Sokolow | |
| 4,139,592 A | 2/1979 | Gallizia | |
| 4,155,972 A | 5/1979 | Hauser et al. | |
| 4,330,584 A | 5/1982 | Doerer | |

(Continued)

FOREIGN PATENT DOCUMENTS

DE    3711079 A1    10/1988

(Continued)

OTHER PUBLICATIONS

United Kingdom Patent Office, *Combined Search and Examination Report*, corresponding British Patent Application No. GB0521011.7, Nov. 18, 2005.

(Continued)

*Primary Examiner*—Joseph D Pape
(74) *Attorney, Agent, or Firm*—Wood, Herron & Evans, L.L.P.

(57) ABSTRACT

The present invention provides for an improved trim part, such as an automotive handle, with a soft feel, for use in a trim assembly, and to a continuous two-shot molding operation that may be continuously performed utilizing a single mold assembly. In an exemplary embodiment, an automotive handle includes a substrate formed by injecting a first material into a first shot mold cavity in a first shot of a molding operation. A handle cover is molded to at least a portion of the substrate by injecting into a mold chamber a second foamed material in a second shot of the molding operation to provide the handle with a soft feel. The second foamed material includes a foamed material that produces a soft, outer skin and a light, cellular inner core such that when a force is applied to the cover, the skin will deform and compress the inner core, providing a soft-touch feel to the handle.

6 Claims, 3 Drawing Sheets

U.S. PATENT DOCUMENTS

| | | |
|---|---|---|
| 4,470,936 A | 9/1984 | Potter |
| 4,543,366 A | 9/1985 | Smith |
| 4,766,025 A | 8/1988 | Sanok et al. |
| 4,781,956 A | 11/1988 | Zimmermann et al. ........ 428/43 |
| 4,783,114 A | 11/1988 | Welch |
| 4,810,452 A | 3/1989 | Taillefert et al. ............. 264/247 |
| 4,902,362 A | 2/1990 | Stewart et al. |
| 4,929,017 A | 5/1990 | Lilienthal et al. |
| 4,952,358 A | 8/1990 | Okina et al. |
| 4,958,883 A | 9/1990 | Iwaki et al. |
| 5,002,307 A | 3/1991 | Heidorn |
| 5,040,335 A | 8/1991 | Grimes ........................ 49/502 |
| 5,071,605 A | 12/1991 | Kawaguchi et al. ......... 264/45.2 |
| 5,073,318 A | 12/1991 | Rohriach et al. ........... 264/46.5 |
| 5,096,221 A | 3/1992 | Combs et al. |
| 5,141,279 A | 8/1992 | Weller |
| 5,224,299 A | 7/1993 | Abe ............................. 49/502 |
| 5,297,842 A | 3/1994 | Hayashi |
| 5,382,047 A | 1/1995 | Gajewski |
| 5,387,390 A | 2/1995 | Kornylo .................... 264/46.8 |
| 5,395,135 A | 3/1995 | Lim et al. |
| 5,399,393 A | 3/1995 | Zoller |
| 5,407,225 A | 4/1995 | Cooper |
| 5,433,910 A | 7/1995 | Mukai et al. |
| 5,445,430 A | 8/1995 | Nichols ....................... 296/153 |
| 5,456,490 A | 10/1995 | Carter et al. |
| 5,474,841 A | 12/1995 | Matsuki et al. ........... 428/304.4 |
| 5,478,516 A | 12/1995 | Malm et al. |
| 5,484,561 A | 1/1996 | Weber et al. |
| 5,502,942 A | 4/1996 | Gras et al. |
| 5,527,084 A | 6/1996 | Scherf |
| 5,536,351 A | 7/1996 | Rheinlander et al. ........ 156/212 |
| 5,562,797 A | 10/1996 | Phelps |
| 5,571,581 A | 11/1996 | Koizumi et al. |
| 5,571,597 A | 11/1996 | Gallagher et al. ............ 428/152 |
| 5,573,617 A | 11/1996 | Franck et al. ................ 156/196 |
| 5,582,789 A | 12/1996 | Stein et al. |
| 5,590,901 A | 1/1997 | MacGregor .............. 280/728.3 |
| 5,591,078 A | 1/1997 | Filion et al. |
| 5,626,382 A | 5/1997 | Johnson et al. |
| 5,626,704 A | 5/1997 | Bowers, Jr. et al. |
| 5,651,998 A | 7/1997 | Bertschi et al. |
| 5,663,210 A | 9/1997 | Sugimoto et al. ............. 521/81 |
| 5,679,296 A | 10/1997 | Kelman et al. |
| 5,679,301 A | 10/1997 | Miklas et al. |
| 5,692,711 A | 12/1997 | Tucker ....................... 248/118 |
| 5,695,699 A | 12/1997 | Naritomi |
| 5,698,283 A | 12/1997 | Yamasaki et al. |
| 5,702,810 A | 12/1997 | Koseki et al. |
| 5,709,912 A | 1/1998 | Goto et al. |
| 5,709,925 A | 1/1998 | Spengler et al. ............. 428/198 |
| 5,715,966 A | 2/1998 | Nagano et al. .............. 220/339 |
| 5,728,342 A | 3/1998 | Wirt et al. |
| 5,728,409 A | 3/1998 | Schad et al. |
| 5,744,077 A | 4/1998 | Grisch et al. |
| 5,744,210 A | 4/1998 | Hoffmann et al. |
| 5,779,262 A | 7/1998 | Totani et al. |
| 5,783,293 A | 7/1998 | Lammi |
| 5,786,047 A | 7/1998 | Tomblin |
| 5,792,413 A | 8/1998 | Ang et al. .................... 264/515 |
| 5,799,385 A | 9/1998 | Vecchiarino et al. .......... 29/469 |
| 5,800,759 A | 9/1998 | Yamazaki et al. |
| 5,803,415 A | 9/1998 | Konishi et al. ................ 248/18 |
| 5,810,388 A | 9/1998 | Berardi et al. ........... 280/728.3 |
| 5,811,053 A | 9/1998 | Ota et al. |
| 5,816,609 A | 10/1998 | Gray et al. ............... 280/728.3 |
| 5,817,345 A | 10/1998 | Koch et al. |
| 5,837,172 A | 11/1998 | Pritchard et al. |
| 5,839,752 A | 11/1998 | Yamasaki et al. |
| 5,853,772 A | 12/1998 | Kudert et al. |
| 5,868,455 A | 2/1999 | Springer et al. |
| 5,871,253 A | 2/1999 | Erber |
| 5,885,662 A | 3/1999 | Gardner, Jr. |
| 5,904,370 A | 5/1999 | Steiner et al. |
| 5,932,331 A | 8/1999 | Jones et al. |
| 5,934,730 A | 8/1999 | Yagishita et al. |
| 5,941,557 A | 8/1999 | Mullins, Jr. |
| 5,951,094 A | 9/1999 | Konishi et al. ............... 296/153 |
| 5,976,289 A | 11/1999 | Kawakubo et al. ............ 156/78 |
| 5,979,931 A | 11/1999 | Totani et al. |
| 5,985,198 A | 11/1999 | Harris et al. |
| 5,995,380 A | 11/1999 | Maue et al. .................. 361/826 |
| 6,003,716 A | 12/1999 | Allison et al. ............... 220/326 |
| 6,012,735 A | 1/2000 | Gray et al. ................ 280/728.2 |
| 6,013,210 A | 1/2000 | Gardner, Jr. ................. 264/40.1 |
| 6,017,617 A | 1/2000 | Gardner, Jr. ............... 428/309.9 |
| 6,019,923 A | 2/2000 | Pelzer |
| 6,042,139 A | 3/2000 | Knox |
| 6,070,905 A | 6/2000 | Renault |
| 6,092,858 A | 7/2000 | Bolwell |
| 6,103,168 A | 8/2000 | Kelly |
| 6,103,390 A | 8/2000 | Kamiya et al. |
| 6,116,672 A | 9/2000 | Cannon et al. |
| 6,117,380 A | 9/2000 | Shirai et al. |
| 6,129,378 A | 10/2000 | Goto et al. |
| 6,129,870 A | 10/2000 | Hettinga |
| 6,129,960 A | 10/2000 | Kudert et al. |
| 6,136,415 A | 10/2000 | Spengler |
| 6,149,853 A | 11/2000 | Luckett et al. ............... 264/266 |
| 6,158,766 A | 12/2000 | Kowalski |
| 6,168,188 B1 | 1/2001 | Preisler et al. ............ 280/728.3 |
| 6,168,742 B1 | 1/2001 | Yamamoto |
| 6,186,582 B1 | 2/2001 | Beckmann |
| 6,210,613 B1 | 4/2001 | Stein et al. .................. 264/45.4 |
| 6,210,614 B1 | 4/2001 | Gardner, Jr. |
| 6,213,506 B1 | 4/2001 | Swann et al. |
| 6,213,538 B1 | 4/2001 | Scheidmantel et al. |
| 6,214,157 B1 | 4/2001 | Sjpengler ................. 156/304.6 |
| 6,217,098 B1 | 4/2001 | O'Brien et al. ............... 296/70 |
| 6,221,304 B1 | 4/2001 | Harris et al. |
| 6,248,200 B1 | 6/2001 | Dailey et al. ................. 156/245 |
| 6,251,326 B1 | 6/2001 | Siano et al. ............... 264/328.8 |
| 6,267,918 B1 | 7/2001 | Bauer |
| 6,280,678 B1 | 8/2001 | Hara et al. |
| 6,308,488 B1 | 10/2001 | Hoshino |
| 6,319,438 B1 | 11/2001 | Smith et al. ................... 264/75 |
| 6,322,738 B1 | 11/2001 | Sicilia et al. |
| 6,357,788 B2 | 3/2002 | Kreile |
| 6,364,351 B1 | 4/2002 | Hier et al. .................... 280/732 |
| 6,368,093 B1 | 4/2002 | Vecchiarino et al. ......... 425/130 |
| 6,391,232 B1 | 5/2002 | Fritsch ....................... 264/46.6 |
| 6,402,189 B1 | 6/2002 | Gray et al. |
| 6,409,947 B1 | 6/2002 | Wandyez |
| 6,431,600 B1 | 8/2002 | Freisler et al. |
| 6,433,728 B1 | 8/2002 | Krupp et al. ................. 341/176 |
| 6,440,514 B1 | 8/2002 | Ueno et al. |
| 6,447,047 B1 | 9/2002 | Marcovecchio et al. |
| 6,453,535 B1 | 9/2002 | Nicholas |
| 6,474,724 B2 | 11/2002 | Lemmon et al. ............. 296/189 |
| 6,479,114 B2 | 11/2002 | Mizuno et al. |
| 6,485,072 B1 | 11/2002 | Werner et al. |
| 6,495,722 B1 | 12/2002 | Zimmerman et al. |
| 6,517,144 B2 | 2/2003 | Kobayashi |
| 6,544,449 B1 | 4/2003 | Gardner ..................... 264/46.5 |
| 6,554,350 B2 | 4/2003 | Takahara |
| 6,568,707 B2 | 5/2003 | Hier et al. .................... 280/732 |
| 6,569,365 B1 | 5/2003 | Mizuno et al. |
| 6,572,300 B2 | 6/2003 | Altonen et al. |
| 6,615,546 B2 | 9/2003 | Furuyama et al. |
| 6,616,216 B2 | 9/2003 | Furuyama et al. |
| 6,627,134 B2 | 9/2003 | Thomson |
| 6,644,727 B2 | 11/2003 | Audibert et al. |
| 6,652,793 B2 | 11/2003 | Corrion et al. ............... 264/242 |
| 6,657,158 B1 | 12/2003 | Shelly et al. |

| | | |
|---|---|---|
| 6,660,781 B1 | 12/2003 | Ghobary et al. |
| 6,669,228 B2 | 12/2003 | Shah et al. |
| 6,688,640 B1 | 2/2004 | Davis, Jr. et al. ......... 280/728.3 |
| 6,706,365 B2 | 3/2004 | Akasaka et al. |
| 6,708,462 B2 | 3/2004 | Pokorzynski et al. |
| 6,740,390 B2 | 5/2004 | Randazzo ................... 428/122 |
| 6,742,830 B2 | 6/2004 | Zimmerman et al. |
| 6,746,067 B2 | 6/2004 | Schmidt et al. |
| 6,749,794 B2 | 6/2004 | Spengler |
| 6,753,057 B1 | 6/2004 | Gardner, Jr. |
| 6,756,004 B2 | 6/2004 | Davis, Jr. et al. ............ 264/255 |
| 6,758,510 B1 | 7/2004 | Starling ...................... 296/39.1 |
| 6,761,388 B2 | 7/2004 | Lein et al. ................ 296/23.34 |
| 6,764,621 B2 | 7/2004 | Schwaighofer |
| 6,764,633 B2 | 7/2004 | Takahashi et al. ........... 264/259 |
| 6,793,181 B1 | 9/2004 | Hallock |
| 6,821,465 B1 | 11/2004 | Stein et al. |
| 6,827,799 B2 | 12/2004 | Zimmer et al. |
| 6,837,544 B2 | 1/2005 | Bornchen et al. |
| 6,841,107 B2 | 1/2005 | Peters et al. |
| 6,857,688 B2 | 2/2005 | Morrison et al. |
| 6,875,484 B1 | 4/2005 | Kogure et al. |
| 6,899,363 B2 * | 5/2005 | Dry ........................... 296/1.09 |
| 6,899,373 B2 | 5/2005 | Kim |
| 6,921,571 B2 | 7/2005 | Funakoshi |
| 6,929,309 B1 | 8/2005 | Radu et al. |
| 6,955,392 B2 | 10/2005 | Dry |
| 6,981,735 B1 | 1/2006 | Stephens |
| 6,983,967 B2 | 1/2006 | Scheldmantal et al. |
| 6,991,841 B2 | 1/2006 | Cowelchuk et al. |
| 7,005,092 B2 | 2/2006 | Dooley et al. |
| 7,018,702 B2 | 3/2006 | Hacke |
| 7,045,206 B1 | 5/2006 | Granata et al. |
| 7,051,438 B2 | 5/2006 | O'Brien et al. |
| 7,055,850 B2 | 6/2006 | Freystedt |
| 7,108,312 B2 | 9/2006 | Cowelchuk et al. |
| 7,156,437 B2 | 1/2007 | Cowelchuk et al. |
| 2001/0030436 A1 | 10/2001 | Kifer et al. |
| 2001/0047899 A1 | 12/2001 | Ikeda .......................... 180/90 |
| 2002/0041912 A1 | 4/2002 | Thomson |
| 2002/0043861 A1 | 4/2002 | Meadows ............... 297/411.21 |
| 2002/0066972 A1 | 6/2002 | Fritsch ....................... 264/46.4 |
| 2002/0079603 A1 | 6/2002 | Bemis et al. |
| 2002/0153741 A1 | 10/2002 | Speelman et al. .............. 296/70 |
| 2003/0011174 A1 | 1/2003 | Merrifield et al. |
| 2003/0017224 A1 | 1/2003 | Byma et al. |
| 2003/0030188 A1 | 2/2003 | Spengler |
| 2003/0041955 A1 | 3/2003 | Spengler |
| 2003/0071039 A1 | 4/2003 | Spykerman et al. |
| 2003/0075833 A1 | 4/2003 | Thomson |
| 2003/0121877 A1 | 7/2003 | Brozell et al. |
| 2003/0155787 A1 | 8/2003 | Lein et al. |
| 2003/0176575 A1 | 9/2003 | Sugimoto et al. |
| 2003/0176576 A1 | 9/2003 | Fujita et al. |
| 2003/0184064 A1 | 10/2003 | Hier et al. ................... 280/732 |
| 2003/0184108 A1 | 10/2003 | Donovan et al. |
| 2003/0209888 A1 | 11/2003 | Davis, Jr. et al. ......... 280/728.3 |
| 2003/0209890 A1 | 11/2003 | Totani et al. |
| 2003/0209892 A1 | 11/2003 | Hier et al. ................... 280/732 |
| 2004/0017023 A1 | 1/2004 | Schoemann et al. |
| 2004/0029986 A1 | 2/2004 | Ghobary et al. |
| 2004/0032055 A1 | 2/2004 | Cavallaro et al. |
| 2004/0119267 A1 | 6/2004 | Cowelchuck et al. .... 280/728.3 |
| 2004/0119268 A1 | 6/2004 | Davis, Jr. et al. ......... 280/728.3 |
| 2004/0130051 A1 | 7/2004 | Cowelchuk et al. |
| 2004/0202824 A1 | 10/2004 | Hayashi et al. |
| 2004/0222619 A1 | 11/2004 | DePue et al. |
| 2005/0046075 A1 | 3/2005 | Youngs et al. |
| 2005/0079336 A1 | 4/2005 | Dry et al. |
| 2005/0183239 A1 | 8/2005 | Chen |
| 2005/0183897 A1 | 8/2005 | DePue |
| 2005/0186388 A1 | 8/2005 | Mekas et al. |
| 2005/0194806 A1 | 9/2005 | Cowelchuk et al. |
| 2005/0242619 A1 | 11/2005 | Schoemann et al. |
| 2005/0258569 A1 | 11/2005 | Schoemann et al. |
| 2005/0258666 A1 | 11/2005 | Reed |
| 2006/0001291 A1 | 1/2006 | Dooley et al. |
| 2006/0029789 A1 | 2/2006 | Donatti et al. |
| 2006/0082173 A1 | 4/2006 | Cowelchuk et al. |
| 2006/0082190 A1 | 4/2006 | Cowelchuk et al. |
| 2006/0216479 A1 | 9/2006 | Cowelchuk et al. |

FOREIGN PATENT DOCUMENTS

| | | |
|---|---|---|
| DE | 19534982 C2 | 6/1996 |
| DE | 4480340 C2 | 12/1996 |
| DE | 19733667 C2 | 2/1999 |
| DE | 198 14 956 A1 | 10/1999 |
| DE | 19934249 | 2/2001 |
| DE | 10104036 | 8/2001 |
| DE | 10120268 A1 | 12/2001 |
| DE | 10123207 | 7/2002 |
| DE | 10160173 A1 | 6/2003 |
| DE | 102004023823 A1 | 12/2004 |
| DE | 60106159 T2 | 9/2005 |
| EP | 0408202 | 1/1991 |
| EP | 0410553 | 1/1991 |
| EP | 0749872 A2 | 12/1996 |
| EP | 0749872 | 3/2000 |
| EP | 1086863 | 3/2001 |
| EP | 1182024 | 2/2002 |
| EP | 1580077 | 9/2005 |
| FR | 2771356 | 5/1999 |
| FR | 2796610 | 1/2001 |
| GB | 2403683 | 1/2005 |
| GB | 2419106 A | 4/2006 |
| GB | 2419317 A | 4/2006 |
| GB | 2419318 A | 4/2006 |
| GB | 2419319 A | 4/2006 |
| GB | 2419322 A | 4/2006 |
| JP | 62170303 A | 7/1987 |
| JP | 63082847 A | 4/1988 |
| JP | 05237871 | 9/1993 |
| JP | 08011145 | 1/1996 |
| JP | 08026054 | 1/1996 |
| JP | 08183059 | 7/1996 |
| JP | 2000/016216 | 7/1998 |
| JP | 10291431 | 11/1998 |
| JP | 11070604 | 3/1999 |
| JP | 11123999 | 5/1999 |
| JP | 11291288 | 10/1999 |
| JP | 2003/103676 | 4/2003 |
| JP | 2003/266476 | 9/2003 |
| JP | 2003266464 A | 9/2003 |
| JP | 2005/119404 | 5/2005 |
| WO | WO 01/25055 | 4/2001 |

OTHER PUBLICATIONS

United Kingdom Patent Office, *Combined Search and Examination Report*, corresponding British Patent Application No. GB0521012.5, Nov. 21, 2005.
UK Patent Office, *Combined Search and Examination Report*, corresponding U.K. Application No. GB0520995.2, Dec. 23, 2005.
UK.Patent Office, *Combined Search and Examination Report*, corresponding U.K. Application No. GB0520998.6, Dec. 23, 2005.
UK Patent Office, *Combined Search and Examination Report*, corresponding U.K. Application No. 0521000.0, Dec. 14, 2005.
UK Patent Office, *Combined Search and Examination Report*, corresponding U.K. Application No. 0521007.5, Dec. 23, 2005.
UK Patent Office, *Combined Search and Examination Report*, corresponding U.K. Application No. 0521009.1, Dec. 16, 2005.
United Kingdom Patent Office, *Combined Search and Examination Report*, corresponding British Application No. GB0522255.9, Jan. 3, 2006.

United Kingdom Patent Office, *Combined Search and Examination Report*, corresponding British Application No. GB0520991.1, Jan. 20, 2006.

United Kingdom Patent Office, *Combined Search and Examination Report*, corresponding British Application No. GB0522230.2, Jan. 31, 2006.

U.S. Patent and Trademark Office, *Office Action mailed* Mar. 1, 2006, related U.S. Appl. No. 10/904,010.

U.S. Patent and Trademark Office, Office Action mailed Mar. 14, 2006, related U.S. Appl. No. 10/904,007.

U.S. Patent and Trademark Office, Notice of Allowance mailed Mar. 24, 2006, related U.S. Appl. No. 10/904,409.

U.S. Patent and Trademark Office, Office Action for related U.S. Appl. No. 10/904,015, mailed May 19, 2006.

U.S. Patent and Trademark Office, Office Action for related U.S. Appl. No. 10/708,312, mailed May 17, 2006.

German Patent Office, Office Action issued Jun. 2, 2006 for corresponding German application.

U.S. Patent and Trademark Office, Office Action to related application U.S. Appl. No. 10/904,010, mailed Jul. 27, 2006.

U.S. Patent and Trademark Office, Office Action to related U.S. Appl. No. 10/904,407, mailed Aug. 14, 2006.

European Patent Office, Combined Search and Examination Report for related UK application No. GB0611060.5, mailed Aug. 1, 2006.

U.S. Patent and Trademark Office, Office Action for related U.S. Appl. No. 10/708,312, mailed Sep. 18, 2006.

United States Patent and Trademark Office, Non-Final Office Action in related U.S. Appl. No. 10/904,408, mailed Oct. 31, 2006 (7 pages).

United States Patent and Trademark Office, Non-Final Office Action in related U.S. Appl. No. 10/703,312, mailed Sep. 18, 2006 (7 pages).

United States Patent and Trademark Office, Non-Final Office Action in related U.S. Appl. No. 10/904,033, mailed Dec. 8, 2006 (6 pages).

United States Patent and Trademark Office, Non-Final Office Action in related U.S. Appl. No. 10/904,015, mailed Dec. 6, 2006 (9 pages).

United States Patent and Trademark Office, Non-Final Office action received in related U.S. Appl. No. 11/160,088, mailed Jan. 23, 2007 (25 pages).

United States Patent and Trademark Office, Non-Final Office Action in related U.S. Appl. No. 10/711,692, mailed Jan. 29, 2007, (51 pages).

German Patent and Trademark Office, Office Action in related Serial No. 11/160,088, mailed Jan. 26, 2007 (5 pages).

United States Patent and Trademark Office, Non-Final Office Action in related U.S. Appl. No. 10/904,032, mailed Feb. 8, 2007, (9 pages).

United States Patent and Trademark Office, Final Office Action in related U.S. Appl. No. 10/708,312, mailed Mar. 23, 2007, (10 pages).

United States Patent and Trademark Office, Final Office Action in related U.S. Appl. No. 10/904,008, mailed Apr. 9, 2007 (7 pages).

United States Patent and Trademark Office, Final Office Action in related U.S. Appl. No. 10/904,408, mailed Apr. 19, 2007.

United States Patent and Trademark Office, Non-Final Office Action in related U.S. Appl. No. 10/904,015, mailed Apr. 17, 2007 (20 pages).

United States Patent and Trademark Office, Final Office Action in related U.S. Appl. No. 10/904,010, mailed May 3, 2007 (17 pages).

United States Patent and Trademark Office, Final Office Action in related U.S. Appl. No. 10/904,033, mailed May 16, 2007 (15 pages).

United States Patent and Trademark Office, Notice of Allowance in related U.S. Appl. No. 11/160,088, mailed Jun. 20, 2007 (10 pages).

United States Patent and Trademark Office, Final Office Action in related U.S. Appl. No. 10/904,032 mailed Jul. 16, 2007 (8 pages).

UK Intellectual Property Office, Patents Act 1977: Examination Report Under Section 18(3), dated Dec. 14, 2007, 3 pages.

United States Patent and Trademark Office, Final Office Action in related U.S. Appl. No. 10/904,407 mailed Aug. 28, 2007 (7 pages).

United States Patent and Trademark Office, Non-Final Office Action in related U.S. Appl. No. 10/904,008 mailed Sep. 10, 2007 (8 pages).

United States Patent and Trademark Office, Non-Final Office Action in related U.S. Appl. No. 10/904,032 mailed Sep. 27, 2007 (8 pages).

United States Patent and Trademark Office, Non-Final Office Action in related U.S. Appl. No. 10/904,408 mailed Oct. 16, 2007 (7 pages).

German Patent Office, Office Action issued in Application No. 10 2005 049 866.3-21, dated Jan. 28, 2008 (4 pages).

German Patent Office, Office Action issued in Application No. 10 2005 050 162.1-21, dated Feb. 1, 2008 (5 pages).

German Patent Office, Office Action issued in Application No. 10 2005 050 164.8-21, dated Feb. 6, 2008 (4 pages).

United States Patent and Trademark Office, Final Office Action in related U.S. Appl. No. 10/904,407, mailed Mar. 11, 2008 (19 pages).

United States Patent and Trademark Office, Non-Final Office Action in related U.S. Appl. No. 10/904,008, mailed Mar. 17, 2008 (13 pages).

United States Patent and Trademark Office, Final Office Action in related U.S. Appl. No. 10/904,032, mailed Mar. 25, 2008 (17 pages).

United States Patent and Trademark Office, Final Office Action in related U.S. Appl. No. 10/904,408, mailed Mar. 26, 2008 (16 pages).

United States Patent and Trademark Office, Final Office Action in related U.S. Appl. No. 10/904,010, mailed May 7, 2008 (10 pages).

United States Patent and Trademark Office, Office Action in related U.S. Appl. No. 10/904,407, mailed Jun. 2, 2008 (16 pages).

German Patent Office, Office Action Issued in Application No. 10 2005 053 477.5-21, dated May 7, 2008 (5 pages).

German Patent Office, Office Action Issued in Application No. 10 2005 052 976.3-21, dated Apr. 28, 2008 (4 pages).

German Patent Office, Office Action Issued in Application No. 10 2005 053 479.1-21 dated May 9, 2008 (4 pages).

United States Patent and Trademark Office, Office Action in related U.S. Appl. No. 11/538,650, mailed Aug. 5, 2008 (107 pages).

United States Patent and Trademark Office, Notice of Allowance in related U.S. Appl. No. 10/904,032, mailed Aug. 5, 2008 (8 pages).

United States Patent and Trademark Office, Notice of Allowance in related U.S. Appl. No. 10/904,008, mailed Jul. 11, 2008 (4 pages).

* cited by examiner

AUTOMOTIVE HANDLE WITH SOFT FEEL AND METHOD OF MAKING THE SAME

CROSS-REFERENCE

The present invention is related to U.S. Ser. No. 10/708,312, filed Feb. 24, 2004, U.S. Ser. No. 10/904,007, filed Oct. 19, 2004, U.S. Ser. No. 10/904,008, filed Oct. 19, 2004, U.S. Ser. No. 10/904,010, filed Oct. 19, 2004, U.S. Ser. No. 10/904,032, filed Oct. 20, 2004, U.S. Ser. No. 10/711,692, filed Sep. 30, 2004, U.S. Ser. No. 10/904,015, filed Oct. 19, 2004, U.S. Ser. No. 10/904,033, filed Oct. 20, 2004, U.S. Ser. No. 904,408, filed Nov. 9, 2004, U.S. Ser. No. 10/904,407, filed Nov. 9, 2004, U.S. Ser. No. 10/904,433, filed Nov. 10, 2004, and U.S. Ser. No. 10/904,409, filed Nov. 9, 2004.

FIELD OF THE INVENTION

The present invention pertains generally to trim parts for automotive interiors and, more particularly, to automotive handles with soft feel such as for use in trim assemblies, and to a method of making the same.

BACKGROUND OF THE INVENTION

It is known to provide automotive interiors with various trim parts to enhance the aesthetic appearance of the automotive interior and to provide comfort, as well as convenience, to vehicle occupants. Examples of some of these interior trim parts include instrument trim panels, door trim panels, console panels, armrests, bolsters, and handles. To improve the comfort to vehicle occupants, it is desired to provide at least portions of some these trim parts, such as handles, with areas that are cushy or soft to the touch.

Notably, certain drawbacks exist with current handles, e.g. grab handles and steering wheels, including a lack of soft feel and inefficient manufacturing and assembly processes. Typically, handles have been formed by multi-step processes generally involving application of a hard-feel material around a substrate, or insert, such as a piece of metal. More specifically, one method for making automotive handles, such as steering wheels, involves insertion of a thin padding material beneath a pliable surface layer of leather, vinyl, or fabric material, which may be secured to a rigid substrate. In other cases, the padding material may be omitted leaving simply the leather, vinyl, or fabric material. Consequently, the methods generally used to produce automotive handles typically result in handles having a hard feel and can be time-consuming and costly due to the multiple components and steps required to make them.

There is thus a need for an improved trim part, e.g. a handle, with a soft feel that may be used in a trim assembly, and a method for making the same, that simplifies the number of parts and steps required for assembly thereof thereby reducing overall manufacturing costs.

SUMMARY OF THE INVENTION

The present invention provides for an improved automotive trim part, such as an automotive handle, with soft feel that may be used in a trim assembly, e.g. a door trim panel or headliner assembly. The trim part with soft feel may include any automotive handle including an overhead or instrument panel grab handle, door assist handle, roll bar handle, steering wheel, and the like, as well as any other desired automotive trim part such as an instrument trim panel, door trim panel, console panel, armrest, bolster, etc.

To this end, the automotive trim part, e.g. automotive handle, is an integrated, unitary structure that includes a substrate made from a first material, which may include a thermoplastic polymer such as a thermoplastic olefin, e.g. polypropylene, or polycarbonate/acrylonitrile butadiene styrene. A cover, e.g. a handle cover, is integrally molded to at least a portion of the substrate and is composed of a second foamed material to provide the soft, cushy feel such as for a vehicle driver or occupant. The second foamed material may be a foamed thermoplastic polymer such as a foamed thermoplastic elastomer or foamed polypropylene.

The foamed material produces a lightweight cover that generally includes an outer skin and a cellular inner core such that when a force is applied, the outer skin will deform and compress the inner core, providing a soft-touch feel to the trim part. The second foamed material is activated, or foamed, by a blowing agent, such as sodium bicarbonate, nitrogen, or any other commonly known blowing agent. At a thickness of about 1.5 mm or less, the cover defines an outer skin but is substantially devoid of a soft inner core because of an inability of the core to be foamed. As such, the thickness of the cover advantageously is about 4-8 mm.

The automotive trim part, such as the handle, with soft feel is formed in a continuous two-shot molding process. In this operation, a mold assembly is provided in which a substrate is formed by injecting the first material into a first shot mold cavity in a first shot of the molding operation. A core of the mold assembly is used, advantageously rotated, to move the substrate from the first shot mold cavity to a second shot mold cavity, and a mold chamber is formed about at least a portion of the substrate within the second shot mold cavity. The cover then is integrally molded thereover by injecting into the mold chamber the second foamed material in a second shot of the molding operation, the cover being molded to the portion of the substrate to provide the trim part, e.g. the handle, with a soft feel. In an exemplary embodiment, the mold assembly for forming the trim part with soft feel includes first and second shot mold cavities and a rotatable core having first and second male portions adapted to mate with each cavity for forming a plurality thereof in a continuous manner.

By virtue of the foregoing, there is thus provided an improved trim part, such as an automotive handle, with a soft feel, and a method of making the same, that reduces the number of parts and the labor required for assembly thereof thereby reducing overall manufacturing costs.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
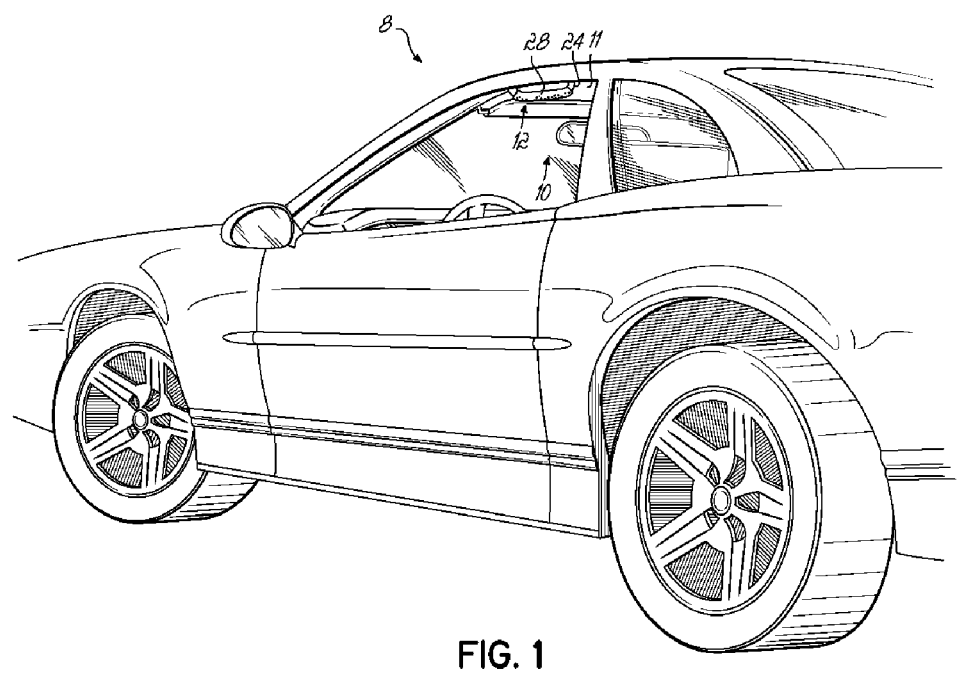
FIG. 1 is a perspective view of an automobile including a headliner having a handle with soft feel according to the present invention.

In FIG. 1, an automobile 8 includes an automotive interior trim assembly, i.e. a headliner assembly 10, having an embodiment of the trim part, i.e. an overhead grab handle 12, with soft feel of the present invention. While the following detailed description focuses on the overhead grab handle 12 with soft feel, those having ordinary skill in the art will recognize that other handles, and other trim parts, with soft feel may equally be considered. Accordingly, it should be understood that the trim part with soft feel may include any automotive handle, such as an instrument panel grab handle, door assist handle, roll bar handle, steering wheel, and the like, as well as any other desired automotive trim part, such as an instrument trim panel, door trim panel, console panel, armrest, bolster, etc., with each trim part with soft feel generally being constructed in a similar fashion as discussed below.

With continuing reference to FIG. 1, the headliner assembly 10 includes a headliner 11 that covers a portion of the interior of the automobile 8 to provide a more aesthetically pleasing environment. The overhead grab handle 12 with soft feel is formed separately from the headliner 10 and secured thereto by means (not shown) commonly known in the art, such as by screws, clips, tacks, adhesives, and the like. In other cases, the trim part 12 with soft feel may be integrally molded to the headliner 11 and, more specifically, the substrate 24 of the handle 12 may be integrated, i.e. integrally molded, therein to provide an integrated handle 12 with soft feel. Notably, the soft feel of the grab handle 12 provides an added comfort to the vehicle's occupants when the handle 12 is grabbed, for example, during movement of the occupant out of or into the automobile 8, or during cornering of the automobile 8.

Figure 4:
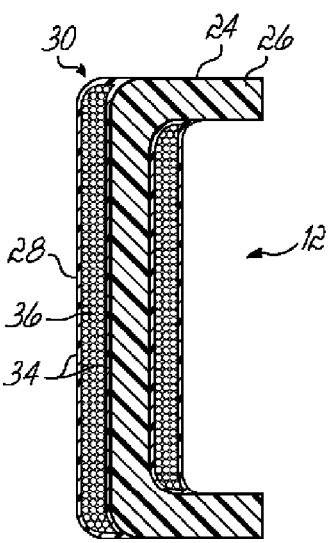
FIG. 4 is a cross-sectional view of the formed handle with soft feel of FIG. 3A removed from the mold.

As further shown in FIGS. 1 and 4, the handle 12 defines an integrated, unitary structure and includes the substrate 24 which is made from a first material 26 that may include a thermoplastic polymer such as a thermoplastic olefin, e.g. polypropylene, or polycarbonate/acrylonitrile butadiene styrene. The overhead grab handle 12 further includes a handle cover 28 that is bonded, i.e. integrally molded, to at least a portion of the substrate 24 to provide the soft, cushy feel for a vehicle driver or occupant. It should be understood that the handle cover 28 may be provided over the entire substrate 24, as well as a portion of the substrate 24 that is more or less than shown.

The handle cover 28 is composed of a second foamed material 30 that may include a foamed thermoplastic polymer such as a foamed thermoplastic elastomer or foamed polypropylene. The second foamed material 30 may be activated, or foamed, by a blowing agent, such as sodium bicarbonate and the like, any gas such as nitrogen, or any other commonly known blowing agent. More specifically, the blowing agent is combined, or mixed, with a thermoplastic polymer, such as a thermoplastic elastomer or polypropylene, advantageously a thermoplastic elastomer available from Kraiburg TPE, Corp. of Duluth, Ga., to produce the second foamed material 30.

The blowing agent advantageously is present in an amount from 0.1% to 5% by weight of the mixture, more advantageously from 0.5% to 3% by weight.

Notably, the foamed material 30 produces the cover 28 which includes an outer skin 34 and a light, cellular inner core 36 such that the outer skin 34 deforms and compresses the inner core 36 when a force is applied thereby advantageously providing a soft feel to the trim part 12. The feel of the cover 28 may be varied, or adjusted, to any desired softness by changing the thickness thereof. At a thickness of about 1.5 mm or less, the cover 28 defines an outer skin 34 but is substantially devoid of a soft inner core 36 because of an inability of the core 36 to be foamed. As such, the thickness of the cover 28 advantageously is about 4-8 mm, more advantageously about 5-7 mm, and most advantageously about 6 mm.

Figure 2:
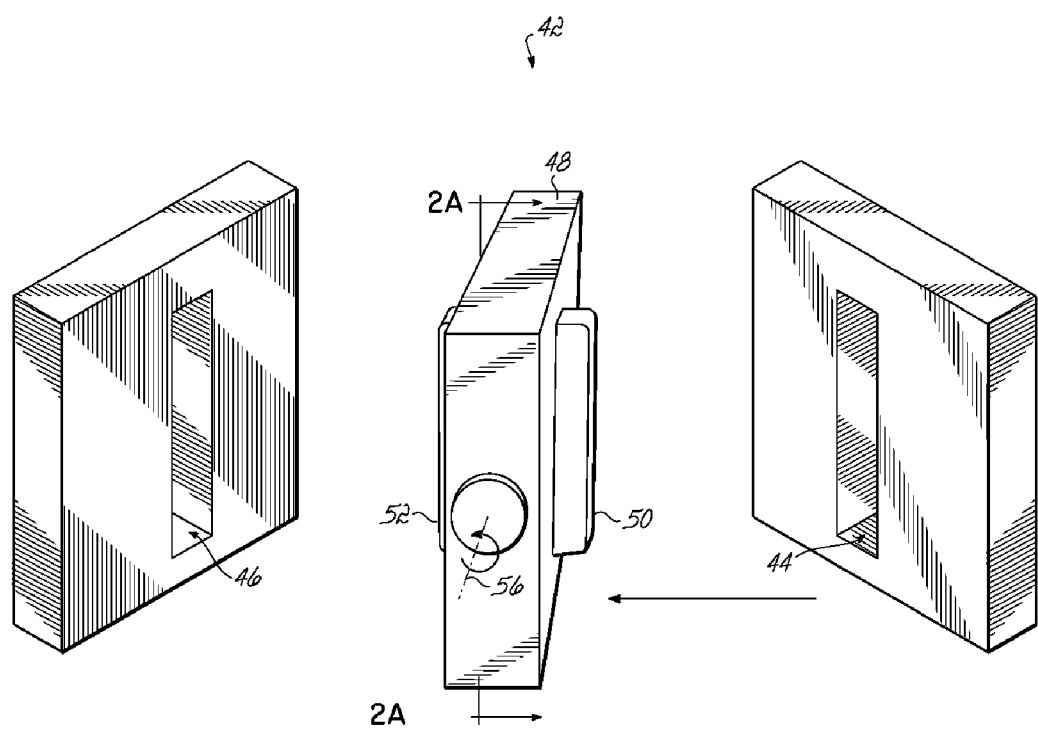
FIG. 2 is a perspective view of a mold assembly used to form the handle with soft feel of FIG. 1.
Figure 3A:
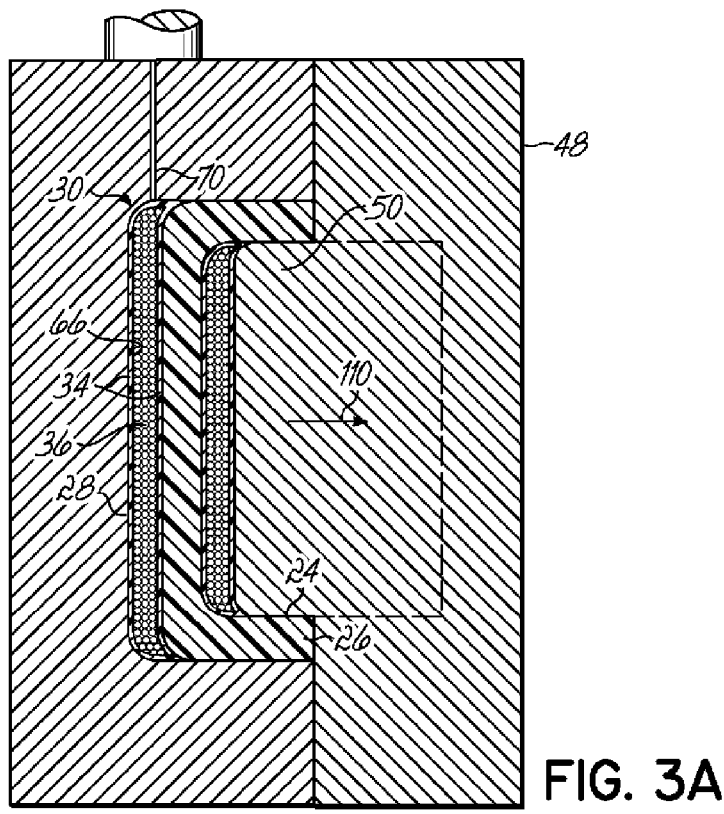
FIG. 3A is a cross-sectional view of the mold of FIG. 3 taken along the line 3A-3A illustrating the second shot of the molding operation.
Figure 3:
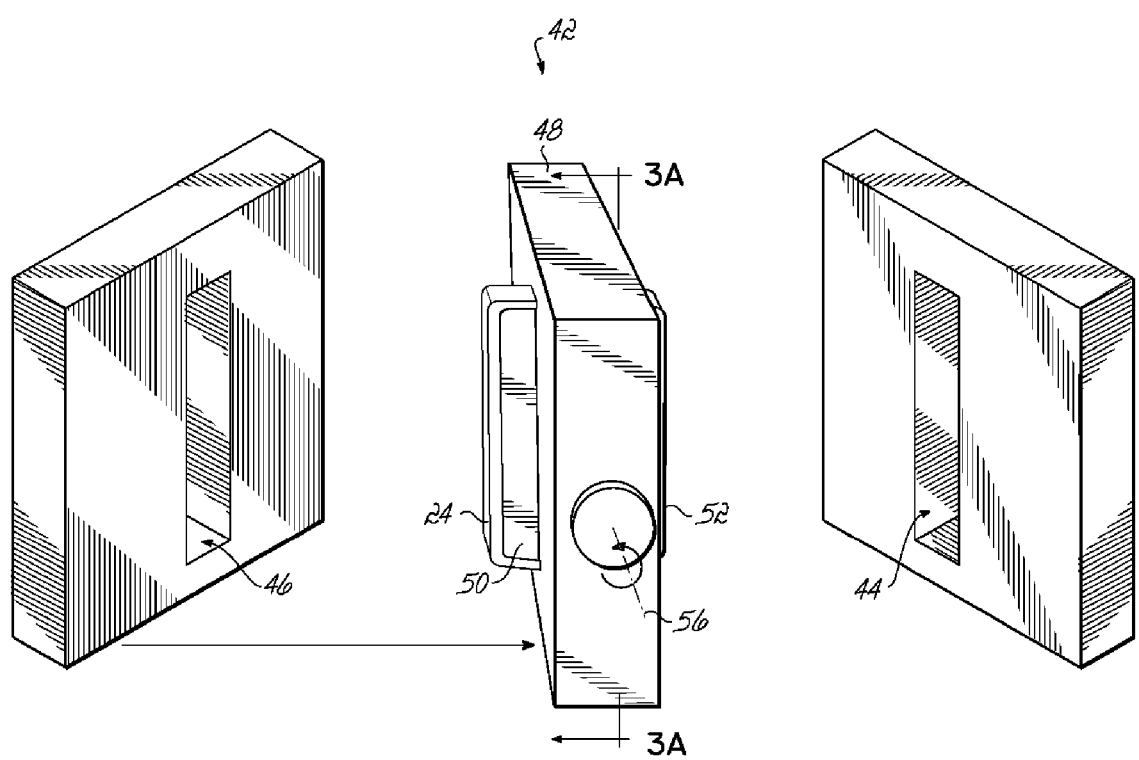
FIG. 3 is a perspective view of the mold assembly of FIG. 2 depicting the movement from the first shot mold cavity to the second shot mold cavity of the formed substrate of FIG. 2A.

With reference to FIGS. 2-3A, a method of making the handle 12 with soft-feel of the present invention will now be described. A single mold assembly 42 is shown in FIG. 2 including spaced apart first and second shot mold cavities 44 and 46 and a central core 48 having first and second male portions 50 and 52 adapted to mate with each cavity 44, 46. The core is 48 situated between the mold cavities 44, 46 and is adapted to rotate about a central axis, i.e. a horizontal axis 56, so that the first and second male portions 50, 52 can mate, in turn, with the mold cavities 44, 46 to mold, in sequence, first the substrate 24 then the handle cover 28 in a continuous manner. It should be understood by the artisan that variations of the mold assembly 42 may be provided and still fall within the scope of this invention. For example, any number of core male portions 50, 52 (i.e. more or less than shown) may be provided, in conjunction with the necessary number of corresponding first and second shot mold cavities 44, 46, for molding the grab handle 12 with soft feel.

Figure 2A:
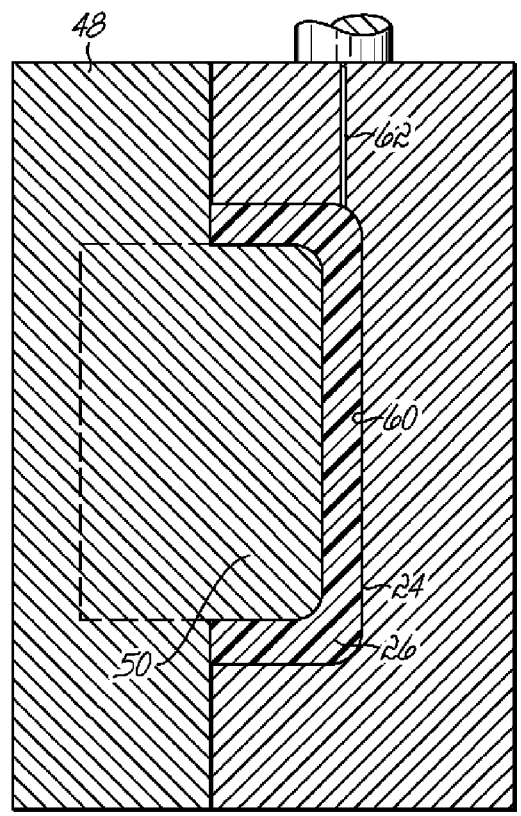
FIG. 2A is a cross-sectional view of the mold of FIG. 2 taken along the line 2A-2A illustrating the first shot of the molding operation.

While the first and second shots of the molding operation are further described below with respect to the first male portion 50 by utilizing the cross-sectional views of FIGS. 2 and 3, it is understood that the first and second shot molding process occurs in the same fashion with respect to the second male portion 52. Accordingly, as best shown in FIGS. 2 and 2A, the first male portion 50 of the core 48 mates with the first shot mold cavity 44 and, more specifically, the first shot mold cavity 44 is adapted to move toward the first male portion 50, as is commonly known in the art, to form a first shot chamber 60.

In a first shot of the molding operation, the first material 26, which may be a thermoplastic polymer such as a thermoplastic olefin, e.g. polypropylene, or polycarbonate/acrylonitrile butadiene styrene, is injected through a channel 62 into the chamber 60 to form the substrate 24. Specifically, the molded substrate 24 is molded over the first male portion 50 such that the first male portion 50 retains the substrate 24.

With further reference to FIGS. 3 and 3A, the first shot mold cavity 44 is retracted, or moved away from, the first male portion 50, and the core 48 having the first male portion 50 provided with the substrate 24 then is rotated about the horizontal axis 56 to move the substrate 24 from the first shot mold cavity 44 to the second shot mold cavity 46. It should be understood that the core 48 also may rotate about a vertical axis (not shown) or be adapted to move, or slide, sideways to a second shot mold cavity. Next, the first male portion 50 of the core 48 mates with the second shot mold cavity 46 and, more specifically, the second shot mold cavity 46 is adapted to move toward the first male portion 50, as is commonly known in the art.

Notably, the first and second male portions 50 and 52 are provided with a retractable portion, i.e. a slider (represented by dashed lines in FIGS. 2A and 3A), which is adapted to retract, as is known in the art, around a portion of the molded substrate 24. Accordingly, as best shown in FIG. 3A, the slider of the first male portion 50 is retracted, as indicated by arrow 110, about a portion of the substrate 24, to form, in conjunction with the second shot mold cavity 46, a second shot chamber 66 to allow for molding of the cover 28 therearound in a second shot of the molding operation. In the second shot, the second foamed material 30, which may be a foamed thermoplastic polymer such as a foamed thermoplastic elastomer or foamed polypropylene, is injected through a channel 70 into the second shot chamber 66 to form the handle cover 28. Consequently, the cover 28 is bonded, i.e. integrally molded, to at least the portion of the substrate 24 to provide the handle 12 with a soft feel.

As indicated above, the second foamed material 30 is activated, or foamed, by a blowing agent that can include sodium bicarbonate and the like, any gas such as nitrogen, or any other known blowing agent. More specifically, the blowing agent is combined, or pre-mixed, with a thermoplastic polymer, such as a thermoplastic elastomer or polypropylene, to form the second foamed material 30. The second foamed material 30 includes an outer skin 34 and a light, cellular inner core 36 such that when a force is applied to the cover 28, the skin 34 will deform and compress the inner core 36, providing the soft-touch feel to the handle 12. In addition, the feel of the handle 12 may be adjusted to any desired softness by varying the thickness of the cover 28, such as by altering the depth of the second shot chamber 66 and/or by altering the extent of retraction of the slider.

After the second foamed material 30 has been allowed time sufficient to cure, the second shot mold cavity 46 is retracted, or moved away from, the first male portion 50, and the handle 12 with soft feel is ejected from the first male portion 50, such as by ejector pins (not shown) or by movement of the slider back to its original position, so that the process may begin anew. Although not illustrated, it is understood that the second male portion 52 also is adapted to mate with the first shot cavity 44, during the mating of the first male portion 50 with the second shot mold cavity 46, to form a second substrate (not shown) that may be identical to the first substrate 24 by injecting the first material 26 into the first shot mold cavity 44 in the first shot of the molding operation. After injection, the core 48 with the second male portion 52 similarly rotates the second substrate to the second shot mold cavity 46 for the second shot of the molding operation while the first male portion 50 returns to the first shot mold cavity 44 to repeat the first shot of the molding operation. In this fashion, a plurality of handles 12 with soft feel may be formed in a continuous and efficient manner.

With further reference to FIGS. 1 and 4, the molded overhead grab handle 12 includes the substrate 24 with handle cover 28 integrally molded thereto thereby forming the handle 12 with soft feel. The handle 12 now may be coupled, by means known in the art, to the headliner 11 for use in a motor vehicle 8. Accordingly, the molding operation of the present invention may be continuously performed utilizing a single mold assembly 42 to provide an improved trim part, i.e. an automotive handle 12, with a soft feel.

Although, the method of making utilizes a single mold assembly 42 for a continuous, integrated process, it still should be understood that the molding process may be performed in more than one mold assembly such that the trim part 12 may be moved from the first shot mold cavity 44 after the first shot to a second shot mold cavity 46 provided in a second, separate mold assembly for the second shot of the molding operation. Movement can be manually or by other means commonly known in the art, e.g. robotically.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. An automotive trim part including an automotive handle with a soft feel, comprising:
   a substrate made from a first material which includes a thermoplastic polymer; and
   an outer cover layer, the outer cover layer defining a handle cover that is integrally molded entirely around and directly to at least a portion of the substrate and that is made from a second material which includes a foamed thermoplastic polymer, the second material including an outer skin and a foamed inner core having a cellular construction, the outer skin and the foamed inner core being integrally formed together from the second material such that the outer skin will deform and compress the foamed inner core when a force is applied to thereby provide the trim part with a soft feel.

2. The automotive trim part of claim 1, wherein the foamed thermoplastic polymer includes one of a foamed thermoplastic elastomer and foamed polypropylene.

3. The automotive trim part of claim 1, wherein the handle cover includes a thickness of about 5-7 mm to provide the soft feel.

4. An automotive trim part including an automotive handle with a soft feel created by a blowing agent, comprising:
   a substrate made from a first material which includes a thermoplastic polymer; and
   an outer cover layer made from a second material which includes a foamed thermoplastic polymer, the outer cover layer defining a handle cover that is integrally molded entirely around and directly to at least a portion of the substrate, the second material of the outer cover layer activated by the blowing agent to define an outer skin and a foamed inner core, the foamed inner core having a cellular construction such that the outer skin will deform and compress the foamed inner core when a force is applied to thereby provide the trim part with a soft feel.

5. The automotive trim part of claim 4, wherein the foamed thermoplastic polymer includes one of a foamed thermoplastic elastomer and foamed polypropylene.

6. The automotive trim part of claim 4, wherein the handle cover includes a thickness of about 5-7 mm to provide the soft feel.

* * * * *